(12) United States Patent
Imamura et al.

(10) Patent No.: US 9,079,551 B2
(45) Date of Patent: Jul. 14, 2015

(54) AUTOMOBILE BUMPER STRUCTURE (71) Applicant: Kabushiki Kaisha Kobe Seiko Sho (Kobe Steel, Ltd.), Kobe (JP)

(72) Inventors: Yoshihaya Imamura, Fujisawa (JP); Kazumori Horiguchi, Shinagawa-ku (JP)

(73) Assignee: Kobe Steel, Ltd., Kobe-shi (JP)

( * ) Notice: Subject to any disclaimer, the term of this patent is extended or adjusted under 35 U.S.C. 154(b) by 64 days.

(21) Appl. No.: 13/891,780

(22) Filed: May 10, 2013

(65) Prior Publication Data
US 2013/0320685 A1   Dec. 5, 2013

(30) Foreign Application Priority Data
Jun. 5, 2012 (JP) ................... 2012-128274

(51) Int. Cl.
*B60R 19/34* (2006.01)
*B60R 19/24* (2006.01)

(52) U.S. Cl.
CPC .................... *B60R 19/24* (2013.01)

(58) Field of Classification Search
CPC ........ B60R 19/04; B60R 19/24; B60R 19/26; B60R 19/34; B60R 19/023; B62D 21/15
USPC ........ 293/153, 132, 133; 296/187.03, 187.09; 188/377
See application file for complete search history.

(56) References Cited

U.S. PATENT DOCUMENTS

| | | | | |
|---|---|---|---|---|
| 4,426,109 A * | 1/1984 | Fike, Jr. | ......................... | 293/133 |
| 5,732,801 A * | 3/1998 | Gertz | ............................. | 188/377 |
| 6,802,548 B2 * | 10/2004 | Shimotsu | ....................... | 293/133 |
| 2011/0042975 A1 * | 2/2011 | Faruque | ........................ | 293/118 |
| 2011/0133512 A1 * | 6/2011 | Mildner et al. | .......... | 296/187.09 |

FOREIGN PATENT DOCUMENTS

| | | |
|---|---|---|
| JP | 2004-237818 | 8/2004 |
| JP | 2010-51974 | 3/2010 |

* cited by examiner

*Primary Examiner* — Jason S Morrow
*Assistant Examiner* — E Turner Hicks
(74) *Attorney, Agent, or Firm* — Oblon, McClelland, Maier & Neustadt, L.L.P.

(57) ABSTRACT

A front stay member is inserted into a through-hole in a bumper reinforcement. A first end of a middle stay member is fitted onto a portion of the front stay member that protrudes from the through-hole until the first end of the middle stay member comes into contact with the bumper reinforcement. A rear stay member is inserted into a second end of the middle stay member until the second end of the middle stay member comes into contact with the step on the rear stay member. A magnetic field shaper is disposed so as to face portions of an outer peripheral surface of the middle stay member that respectively overlap the front stay member and the rear stay member, and the middle stay member is clinched onto the front and rear stay members by applying an electromagnetic force to the magnetic field shaper.

7 Claims, 5 Drawing Sheets

FIG. 4

AUTOMOBILE BUMPER STRUCTURE

BACKGROUND OF THE INVENTION

1. Field of the Invention

The present invention relates to an automobile bumper structure.

2. Description of the Related Art

A bumper structure (skeleton structure), which serves as a reinforcing member, is disposed in a bumper fascia at the front end or the rear end of an automobile such as a passenger car or a truck. A bumper structure includes a bumper reinforcement, which has a beam-like shape, and a bumper stay, to which the bumper reinforcement is fixed. The bumper stay is fixed to a vehicle body at two positions in the vehicle-width direction. To date, methods using a bolt and a nut or welding have been used to join a bumper reinforcement to a bumper stay.

As reduction in the weight and increase in the variety of design of a vehicle body have progressed in recent years, increase in the strength and reduction in the size of a bumper structure have been required. A bumper structure in which a bumper reinforcement is joined to a bumper stay using a bolt and a nut or welding has a problem in that, for example, the bolt may become broken or the bolt or nut may bite into the bumper reinforcement and break the bumper reinforcement. In order to prevent this, the sizes of bolt and nut or the thickness of a weld may be increased. In this case, however, a problem arises in that the weight of the bumper structure increases.

Japanese Unexamined Patent Application Publication No. 2004-237818 describes a bumper structure that is made by electromagnetically expanding a pipe. With the technology described in Japanese Unexamined Patent Application Publication No. 2004-237818, as illustrated in FIG. 2 of the Publication, a shaft portion of a bumper stay is fitted into a hole in a bumper reinforcement, an electrode is inserted into the shaft portion of the bumper stay, and a large pulse current is applied to the inductor, thereby expanding the shaft portion of the bumper stay and forming a flange and a bulging portion. By using the technology described in Japanese Unexamined Patent Application Publication No. 2004-237818, the number of components can be reduced from that of an existing structure in which a bolt and a nut are used. Moreover, increase in man-hours needed to assemble the bumper structure can be prevented. Furthermore, a problem of thermal distortion does not occur because a large amount of heat due to welding is not generated.

Japanese Unexamined Patent Application Publication No. 2010-51974 describes a method for joining a pipe to a member-to-be-joined by expanding the pipe using a segment die. With the technology described in Japanese Unexamined Patent Application Publication No. 2010-51974, a pipe is inserted into an insertion hole in a member-to-be-joined and a portion of the pipe that is inserted into the insertion hole is pressed outward in the radial direction of the pipe by using die segments of a die that is disposed in a hollow space in the pipe, thereby expanding the inserted portion of the pipe and joining the pipe to the member-to-be-joined.

However, the technology described in Japanese Unexamined Patent Application Publication No. 2004-237818 has a problem in that the dimensions of a pipe for which this technology can be used are limited for the following reason. That is, as illustrated in FIG. 2 of the Publication, electromagnetic expansion is performed by disposing an inductor, which is a tool, in a pipe to be expanded, and it is necessary to dispose the inductor in a smaller space when a smaller pipe is used. Moreover, because a small inductor has low strength and durability, this technology has a problem in that it is not suitable for mass-production. Furthermore, in order to increase the strength of a bumper structure, a bumper stay may be formed from a pipe made of a high-strength material. To expand a pipe made of a high-strength material, it is necessary to use an inductor that generates a large expansion force. Because a space for disposing an inductor is limited, the technology has a problem in that it cannot be used to make a bumper stay from a pipe made of a high-strength material. That is, the technology described in Japanese Unexamined Patent Application Publication No. 2004-237818 has a problem in that it cannot be sufficiently adapted for increase in the strength and reduction in the size of a bumper structure.

The technology described in Japanese Unexamined Patent Application Publication No. 2010-51974 has a problem in that a sufficiently large expansion force cannot be obtained when the diameter of a pipe to be expanded is small because only a small tool can be inserted into such a pipe. Moreover, this technology, which uses a segmented die, has a problem in that a pipe cannot be uniformly expanded over the entire circumference. That is, the technology described in Japanese Unexamined Patent Application Publication No. 2010-51974 has a problem in that it cannot be sufficiently adapted for increase in the strength and reduction in the size of a bumper structure.

SUMMARY OF THE INVENTION

Accordingly, it is an object of the present invention to provide an automobile bumper structure that has advantages of high strength and small size.

According to the present invention, an automobile bumper structure includes a bumper reinforcement extending in a vehicle-width direction and including a through-hole extending therethrough in a vehicle-length direction from a front wall to a rear wall thereof; and a bumper stay including a front stay member, a rear stay member, and a middle stay member. The front stay member includes a tubular portion and a flange extending outward from an outer peripheral edge at a first end of the tubular portion, and the front stay member is inserted into the through-hole so that the flange is in surface contact with the front wall of the bumper reinforcement and so that a second end of the tubular portion protrudes from the rear wall of the bumper reinforcement. The rear stay member includes a tubular portion and a flange extending outward from an outer peripheral edge at a first end of the tubular portion. The middle stay member has a tubular shape, a first end of the middle stay member is fitted onto the second end of the tubular portion of the front stay member protruding from the rear wall of the bumper reinforcement, and a second end of the middle stay member is fitted onto a second end of the tubular portion of the rear stay member. A portion of the middle stay member that overlaps the front stay member and a portion of the middle stay member that overlaps the rear stay member are electromagnetically compressed so that the middle stay member is clinched onto the front stay member and the rear stay member. In the automobile bumper structure according to the present invention, the middle stay member may be clinched onto the front stay member and the rear stay member by disposing a magnetic field shaper so that the magnetic field shaper faces the an outer peripheral surface of the portion of the middle stay member that overlaps the front stay member and an outer peripheral surface of the portion of the middle stay member that overlaps the rear stay member and electromagnetically compressing the middle stay member by applying an electromagnetic force to the magnetic field shaper.

In this structure, the bumper stay is divided into three members, that is, the front stay member, the middle stay member, and the rear stay member; and the flanges are formed beforehand on the front stay member and the rear stay member. The front stay member is inserted into the through-holes in the bumper reinforcement until the flange of the front stay member comes into surface contact with the front wall of the bumper reinforcement. The first end of the middle stay member is fitted onto the tubular portion of the front stay member, which protrudes from the rear wall of the bumper reinforcement, until the first end comes into the rear wall of the bumper reinforcement. The second end of the tubular portion of the rear stay member is inserted into the second end of the middle stay member. A flange, which is fixed to the vehicle, is disposed at the first end of the rear stay member. The magnetic field shaper is disposed so as to face and cover the outer peripheral surface of the overlapping portion of the front stay member and the middle stay member and the outer peripheral surface of the overlapping portion of the rear stay member and the middle stay member. The front stay member and the middle stay member and the rear stay member and the middle stay member are respectively clinched to each other by electromagnetically compressing the middle stay member by applying an electromagnetic force to the magnetic field shaper using the inductor disposed outside the magnetic field shaper. Thus, the three members of the bumper stay are clinched to each other by electromagnetic compression, and the bumper stay can be firmly fixed to the bumper reinforcement. Because the magnetic field shaper and the inductor are disposed outside of the bumper stay, a space for disposing the magnetic field shaper is not limited, and the bumper stay can be reduced in size. By performing electromagnetic compression by applying high power to the magnetic field shaper, clinching can be performed with a strong force, so that a high-strength material can be used as the material of the bumper stay. Accordingly, the strength of the bumper structure is increased and the size of the bumper structure can be reduced. By forming the flanges beforehand on the front stay member and the rear stay member, it is not necessary to form the flanges afterwards by electromagnetic expansion. Accordingly, the number of man-hours needed to manufacture the bumper structure is reduced and the workload is reduced. In the present invention, the side on which impact occurs is called a "front" side regardless of whether it is the front side or the rear side of a vehicle. The "front wall" and the "rear wall" of the bumper reinforcement are used in this sense. In the present invention, electromagnetic compression refers to a method of causing a tube to contract by using an electromagnetic force.

In the automobile bumper structure according to the present invention, each of the front stay member and the rear stay member may include a cover portion at the second end of the tubular portion thereof, the cover portion covering an opening at the second end of the tubular portion.

In this case, the bumper stay has high rigidity, and the thickness of the bumper stay can be reduced. As a result, the weight of the bumper stay can be reduced. Because the bumper stay has high rigidity, a tow hook attachment member can be formed on a cover portion of the front stay member. By forming a tow hook attachment member on the cover portion, a tow hook can be attached to the tow hook attachment member of the cover portion through an opening of the front stay member on the flange side, and the tow hook may be used to pull the vehicle.

The automobile bumper structure according to the present invention may further include a reinforcement plate that is disposed between the middle stay member and the bumper reinforcement so as to be in contact with an end of the middle stay member and so as to surround an outer periphery of the tubular member of the front stay member in a state in which the middle stay member is fitted onto the front stay member.

In this case, because the reinforcement plate is disposed between the middle stay member and the bumper reinforcement so as to be in contact with the end portion of the middle stay member, when an axial load is applied to the middle stay member in the vehicle-length direction, the middle stay member does not penetrate into the bumper reinforcement but collapses into an accordion-like shape. Therefore, collision energy applied to the vehicle can be efficiently absorbed.

In the automobile bumper structure according to the present invention, the middle stay member may include a plurality of recesses.

In this case, because the middle stay member includes the plurality of recesses, when an axial load is applied to the middle stay member in the vehicle-length direction, the recesses collapse first and the middle stay member collapses into an accordion-like shape. Therefore, collision energy applied to the vehicle can be efficiently absorbed.

In the automobile bumper structure according to the present invention, an insulating resin layer may be formed beforehand on either one of an outer peripheral surface of a portion of the front stay member that overlaps the middle stay member and an inner peripheral surface of the portion of the middle stay member that overlaps the front stay member, and an insulating resin layer may be formed beforehand on either one of an outer peripheral surface a portion of the rear stay member that overlaps the middle stay member and an inner peripheral surface of the portion of the middle stay member that overlaps the rear stay member.

Thus, when the middle stay member is electromagnetically compressed, the front stay member and the rear stay member may be compressed to some extent. In this case, however, because insulating resin layers are disposed between the middle stay member and the front stay member and between the middle stay member and the rear stay member, the middle stay member is insulated from the front stay member and the rear stay member. Accordingly, when the middle stay member is electromagnetically compressed, the amount of contraction of each of the front stay member and the rear stay member is smaller than the amount of contraction of the middle stay member, so that these members can be more strongly clinched to each other. An adhesive tape, which has an adhesive layer on a substrate, may be used as the insulating resin layer. In this case, due to an adhesive force of the adhesive tape, the middle stay member can be more strongly joined to the front stay member and the rear stay member.

In the automobile bumper structure according to the present invention, the front stay member and the rear stay member may be each made of a material that has a lower electrical conductivity and a higher rigidity than a material of the middle stay member. To be specific, the middle stay member may be made of an aluminum alloy and the front stay member and the rear stay member may be each made of a high-strength aluminum alloy or steel. Alternatively, the front stay member and the rear stay member may be each made of a steel material coated with an insulating layer.

When the middle stay member is electromagnetically compressed, the front stay member and the rear stay member may be compressed to some extent. In this case, however, the front stay member and the rear stay member are made of a material having a lower electrical conductivity and a higher rigidity than the material of the middle stay member. Accordingly, when the middle stay member is electromagnetically compressed, the amount of contraction of each of the front stay member and the rear stay member is smaller than the amount of contraction of the middle stay member, and these members can be more strongly clinched to each other. To be specific, when the middle stay member is made of an aluminum alloy (for example, 7N01 alloy) and the front stay member and the rear stay member are each made of a high-strength aluminum alloy or steel, the middle stay member has a higher electrical conductivity and a lower rigidity than the front stay member and the rear stay member. Moreover, when the front stay member and the rear stay member are each made of a steel material coated with an insulating layer, the insulation layer disposed between the middle stay member and the front stay member and rear stay member has an insulation effect. Accordingly, when the middle stay member is electromagnetically compressed, the amount of contraction of each of the front stay member and the rear stay member is made further smaller than the amount of contraction of the middle stay member, and these members can be more strongly clinched to each other.

With the present invention, an automobile bumper structure that has advantages of high strength and small size can be provided.

DESCRIPTION OF THE PREFERRED EMBODIMENTS

Hereinafter, an automobile bumper structure according to an embodiment of the present invention and a method of manufacturing the automobile bumper structure will be described. The embodiment described below is only exemplary and does not limit the scope an automobile bumper structure according to the present invention and a method of manufacturing the automobile structure. That is, an automobile bumper structure according to the present invention and a method of manufacturing the automobile structure are not limited to the embodiment described below and can be modified in various ways within the scope of the present invention that is described in the claims.

Figure 1A:
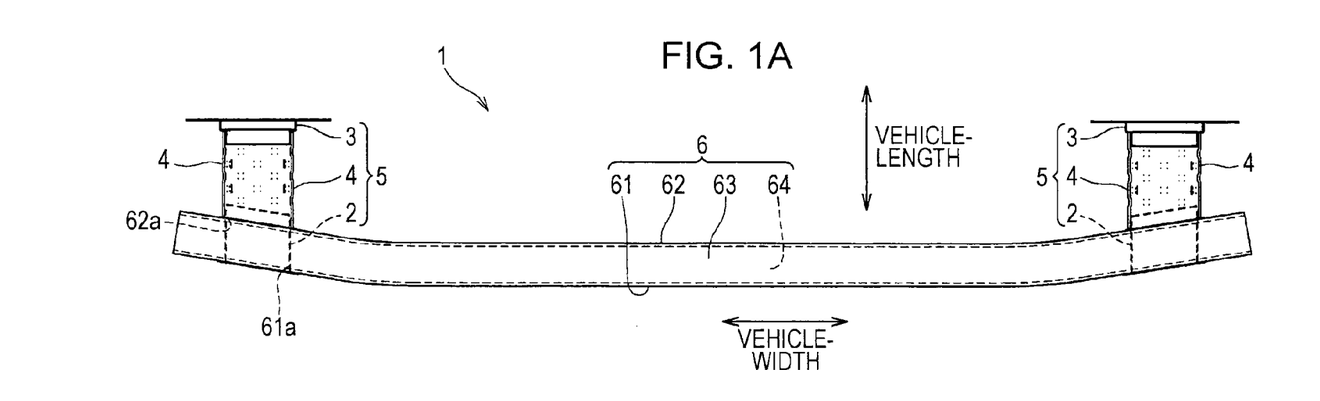
FIG. 1A is sectional view of an automobile bumper structure according to an embodiment.
Figure 1B:
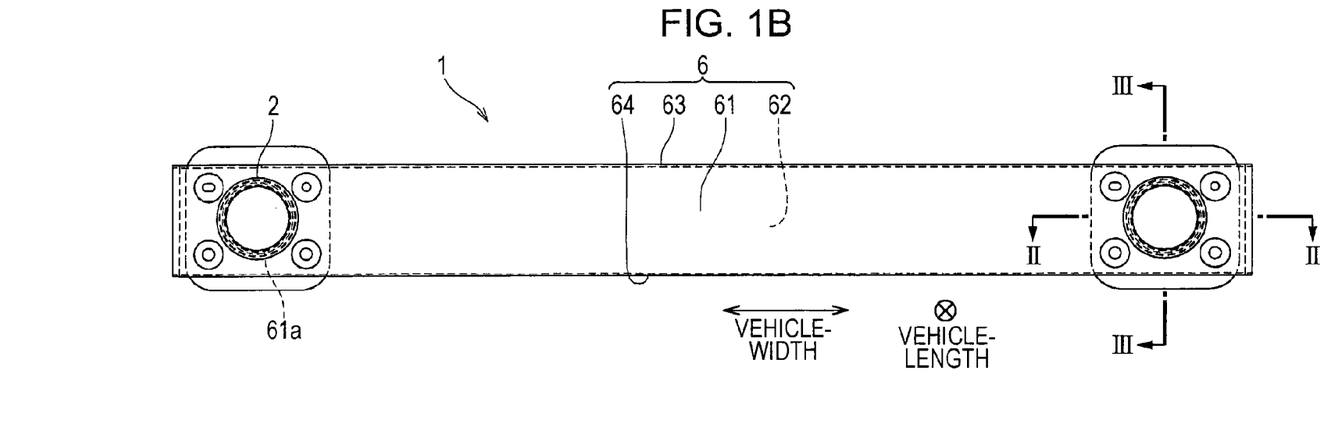
FIG. 1B is a front view of the automobile bumper structure seen from the outside of a vehicle in the vehicle-length direction.
Figure 2:
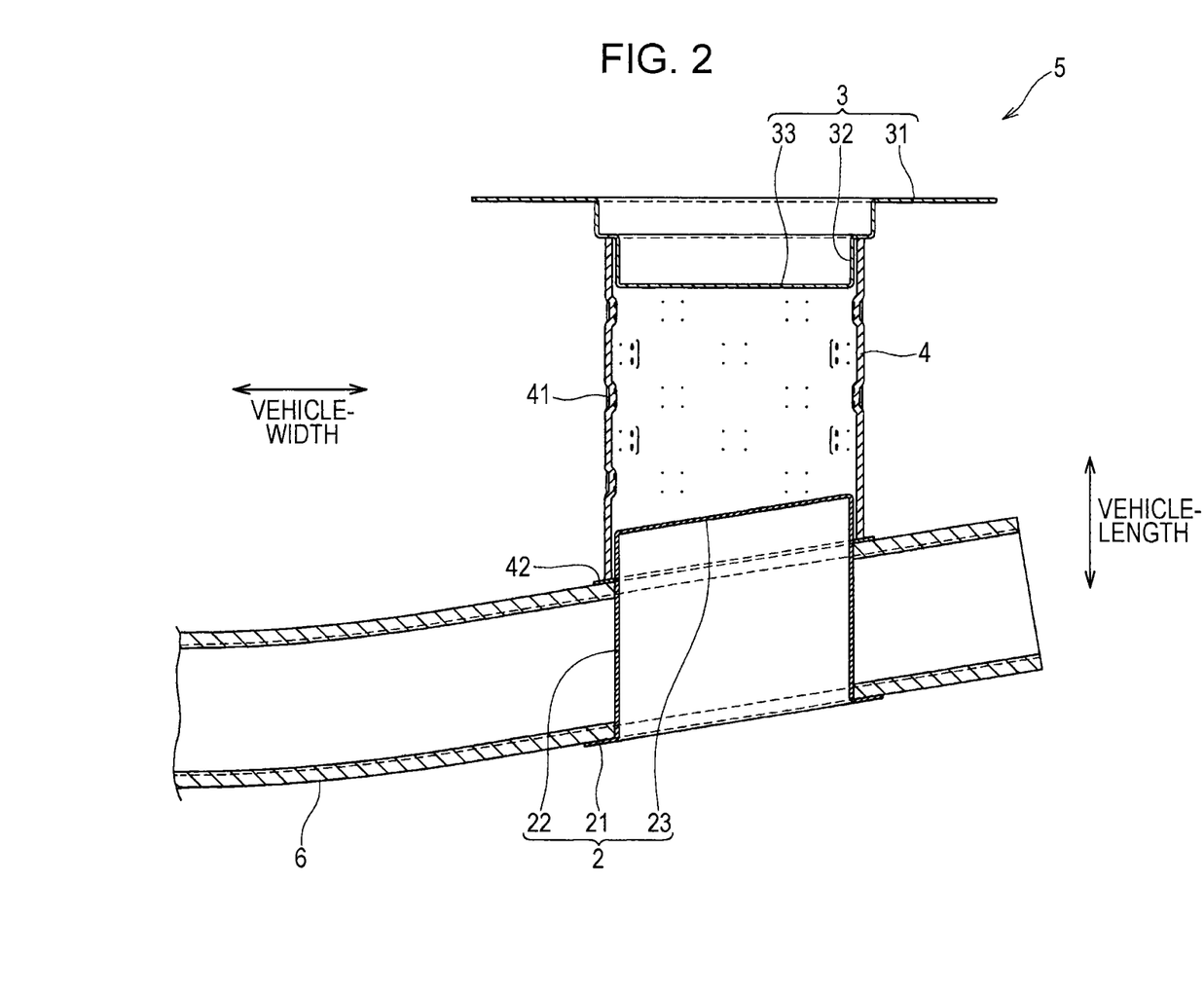
FIG. 2 is a sectional view of the automobile bumper structure according to the embodiment taken along line II-II of FIG. 1B.
Figure 3:
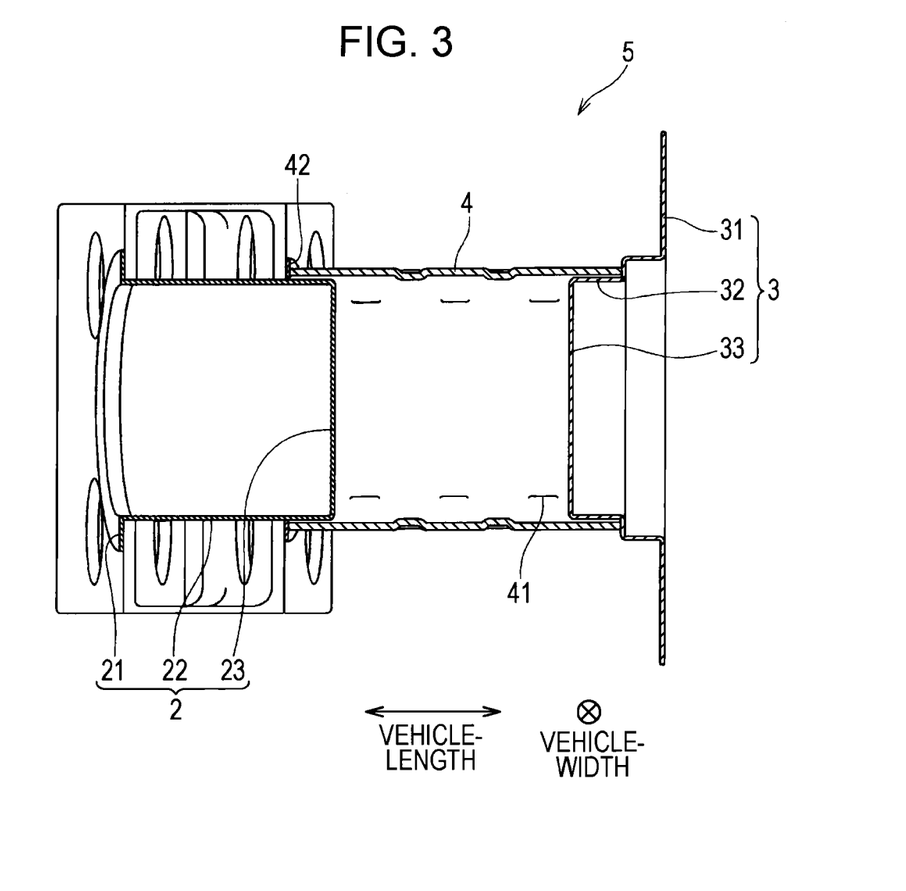
FIG. 3 is a sectional view of the automobile bumper structure according to the embodiment taken along line III-III of FIG. 1B.
Figure 4:
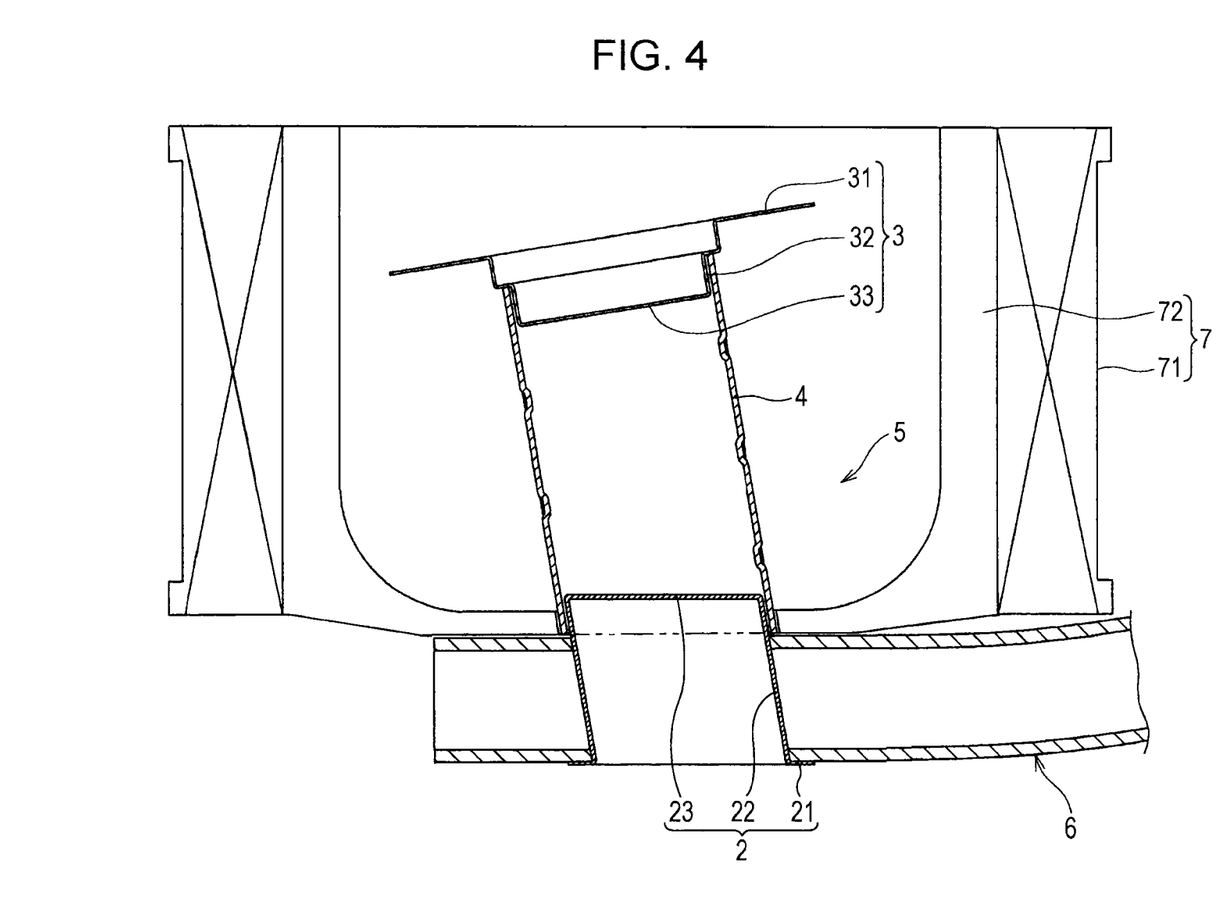
FIG. 4 is a sectional view illustrating a bumper stay according to the embodiment that is being clinched to each other by electromagnetic compression.

Referring to FIGS. 1A to 4, an automobile bumper structure according to the present embodiment will be described. FIG. 1A is sectional view of the automobile bumper structure according to the present embodiment, and FIG. 1B is a front view of the automobile bumper structure seen from the outside of a vehicle in the vehicle-length direction. FIG. 2 is a sectional view of the automobile bumper structure according to the present embodiment taken along line II-II of FIG. 1B. FIG. 3 is a sectional view of the automobile bumper structure according to the present embodiment taken along line III-III of FIG. 1B. FIG. 4 is a sectional view illustrating a bumper stay according to the present embodiment that is being clinched by electromagnetic compression.

As illustrated in FIG. 1A, an automobile bumper structure 1 according to the present embodiment includes a bumper reinforcement 6 and a pair of bumper stays 5. Each of the bumper stays 5 includes a front stay member 2, a rear stay member 3, and a middle stay member 4.

The bumper reinforcement 6 is a hollow tubular member that includes a front wall 61, a rear wall 62, a side wall 63, and a side wall 64. The bumper reinforcement 6 has a rectangular cross section and extends in the longitudinal direction, which corresponds to the vehicle-width direction. The bumper reinforcement 6 is made of, for example, an aluminum alloy. Moreover, the bumper reinforcement 6 has inclined portions at both end portions thereof in the longitudinal direction. The inclined portions are bent toward the inside of the vehicle body (toward the back of the vehicle body in the case of a front bumper, and toward the front side of the vehicle body in the case of a rear bumper) so that the bumper reinforcement 6 can be installed in a bumper fascia. A through-hole 61a and a through-hole 62a, each having a circular opening, are respectively formed in the front wall 61 and in the rear wall 62 of each of the inclined portions at the left and right ends of the bumper reinforcement 6, which are separated from each other in the vehicle-width direction. The through-holes 61a and 62a respectively extend through the front and rear walls 61 and 62 along a central axis extending in the vehicle-length direction. The through-holes 61a and 62a may have, instead of a circular shape, any shape such as a rectangular shape as long as the they have substantially the same shape as that of a tubular portion 22 (described below) of the front stay member 2 so that the tubular portion 22 can be inserted into the through-holes 61a and 62a substantially without a gap. As illustrated in FIG. 1B, through-holes are formed around each of the through-holes 61a and 62a so as to extend through the front wall 61 and the rear wall 62 along central axes in the vehicle-length direction. The through-holes are arranged so as to correspond to bolt holes in a flange 31 (described below) of the rear stay member 3 and are used to insert a bolt into the flange 31.

The bumper reinforcement 6 is made by, for example, extruding an aluminum alloy so as to form a tubular member having a rectangular cross section. Alternatively, the bumper reinforcement 6 may be made by a method that includes bending an aluminum alloy plate a plurality of times, butting end portions of the plate against each other so as to form a tubular shape having a rectangular cross section, and joining the end portions to each other by welding or the like. The bumper reinforcement 6 may be made of steel instead of an aluminum alloy. In the case where the bumper reinforcement 6 is made of steel, the bumper reinforcement 6 may be made by bending a steel plate a plurality of times, and butt-welding ends of the bent steel plate to each other. Alternatively, the bumper reinforcement 6 may be made by bending a plurality of steel plates so as to form members having an L-shaped cross section or a U-shaped cross section, and butt-welding these members to each other.

As necessary, one or more ribs may be formed in a hollow space inside the bumper reinforcement 6. When the bumper reinforcement 6 is provided with a plurality of ribs (each having, for example, an I-shaped cross section), the bumper reinforcement 6 is reinforced and can effectively absorb collision energy. The bumper reinforcement 6 may be composed of one tubular member or a plurality of tubular members. To make the bumper reinforcement 6 from a plurality of tubular members, the tubular members are arranged in the front-back direction or in the up-down direction of the vehicle body and adjacent tubular members are joined to each other by, for example, welding.

As illustrated in FIGS. 2 and 3, the front stay member 2 according to the present embodiment, which has a flanged-cup-like shape, includes the tubular portion 22, a flange 21, and a cover portion 23. The flange 21 extends outward from an outer peripheral edge at a first end of the tubular portion 22. The cover portion 23 covers an opening at a second end of the tubular portion 22. It is preferable that the front stay member 2 be made of a material that has a lower electrical conductivity and a higher rigidity than the material of the middle stay member 4 (described below). The front stay member 2 is made of, for example, a high-strength aluminum alloy or steel. The front stay member 2 is made by, for example, drawing such a material so as to form a flanged-cup-like shape in which the flange 21, the tubular portion 22, and the cover portion 23 are integrated with each other. In the case where the front stay member 2 is made of steel, the flange 21, the tubular portion 22, and the cover portion 23 may be each made from a steel plate, and the front stay member 2 may be formed so as to have a flanged-cup-like shape by butt-welding these members to each other.

The flange 21 has a circular shape and surrounds the entire periphery of the first end of the tubular portion 22. The outside diameter of the flange 21 is larger than the diameter of the through-hole 61a in the front wall 61. The flange 21 may have, instead of a circular shape, any appropriate shape as long as the flange 21 is larger than the through-hole 61a and can be attached to the front wall 61.

The tubular portion 22 has such a shape that the tubular portion 22 can be inserted into the through-hole 61a in the front wall 61 and the through-hole 62a in the rear wall 62 substantially without a gap therebetween. The cross-sectional shape of the tubular portion 22 is substantially uniform from the first end, at which the flange 21 is disposed, to the second end, at which the cover portion 23 is disposed. In the present embodiment, the tubular portion 22 is cylindrical and has a circular cross section. The tubular portion 22 has such an outside diameter that the tubular portion 22 can be inserted into the through-holes 61a and 62a, each having a circular shape, substantially without a gap therebetween. The tubular portion 22 has a central axis extending substantially in the vehicle-length direction. An edge of the tubular portion 22 at the first end, at which the flange 21 is disposed, and an edge of the tubular portion 22 at the second end, at which the cover portion 23 is disposed, each have a slope that matches the slope of the inclined portion of the front wall 61 of the bumper reinforcement 6. The second end of the tubular portion 22, at which the cover portion 23 is disposed, is inserted from the front wall 61 of the bumper reinforcement 6 into the through-hole 61a and then into the through-hole 62a until the flange 21 comes into surface contact with the front surface of the front wall 61 around the entire periphery of the through-hole 61a. In this state, the central axis of the tubular portion 22 extends substantially in the vehicle-length direction and the tubular portion 22 protrudes from the through-hole 62a in the rear wall 62 of the bumper reinforcement 6 by a predetermined length. Here, the predetermined length is a length that is necessary to insert a first end portion of the middle stay member 4 (described below) and to clinch the middle stay member 4 by electromagnetic compression. It is not necessary that the edge of the tubular portion 22 at the second end, at which the cover portion 23 is disposed, have a slope that matches the slope of the inclined portion of the front wall 61 of the bumper reinforcement 6. Alternatively, for example, the edge may be substantially parallel to the flange 31 (described below) of the rear stay member 3.

The cover portion 23, which is circular, is disposed inward from the outer peripheral edge so as to close the opening at the second end. A tow hook attachment member (not shown) may be formed on the cover portion 23. By forming a tow hook attachment member on the cover portion 23, a tow hook can be attached to the tow hook attachment member of the cover portion 23 through an opening of the tubular portion 22 on the flange 21 side, and the tow hook may be used to pull the vehicle. The cover portion 23 may be omitted. In this case, the second end of the tubular portion 22 is open. However, by providing the cover portion 23, the rigidity of the front stay member 2 can be increased and the front stay member 2 can be made thinner, so that reduction in the weight of the bumper stay can be realized.

As illustrated in FIGS. 2 and 3, the rear stay member 3 according to the present embodiment, which has a flanged-cup-like shape, includes a tubular portion 32, the flange 31, and a cover portion 33. The flange 31 extends outward from an outer peripheral edge at a first end of the tubular portion 32. The cover portion 33 covers an opening at a second end of the tubular portion 32. It is preferable that the rear stay member 3 be made of a material that has a lower electrical conductivity and a higher rigidity than the material of the middle stay member 4 (described below). The rear stay member 3 is made of, for example, a high-strength aluminum alloy or steel. The rear stay member 3 is made by, for example, drawing such a material so as to form a flanged-cup-like shape in which the flange 31, the tubular portion 32, and the cover portion 33 are integrated with each other. In the case where the rear stay member 3 is made of steel, the flange 31, the tubular portion 32, and the cover portion 33 may be each made from a steel plate, and the rear stay member 3 may be formed so as to have a flanged-cup-like shape by butt-welding these members to each other.

The flange 31 has, for example, a rectangular shape and surrounds the entire periphery of the first end of the tubular portion 32. Bolt holes for inserting bolts are formed at, for example, four positions in four corner portions of the flange 31. The rear stay member 3 is fixed to the vehicle body by inserting bolts into the bolt holes while holding the flange 31 so as to be in surface contact with the vehicle body or by inserting stud bolts, which have been attached to the vehicle body beforehand, into the bolt holes in the flange 31 and screwing nuts onto the stud bolts. Thus, the bumper stays 5 support the entirety of the bumper structure 1 through the rear stay members 3.

A second end portion of the tubular portion 32, at which the cover portion 33 is disposed, has such a shape that the second end portion can be inserted into the middle stay member 4 (described below) substantially without a gap therebetween. The shape of the second end portion is substantially the same as that of the tubular portion 22 of the front stay member 2. The tubular portion 32 according to the present embodiment has a stepped tubular shape having circular cross sections that are concentric with each other. The cross section of the second end portion, at which the cover portion 33 is disposed, has a smaller diameter. Here, the second end portion of the tubular portion 32, at which the cover portion 33 is disposed, will be referred to as a small diameter portion. A first end portion of the tubular portion 32 near, at which the flange 31 is disposed, will be referred to as a large diameter portion. The small diameter portion of the tubular portion 32 has a circular cross section that is substantially the same as that of the tubular portion 22 of the front stay member 2, so that the small diameter portion can be inserted into the middle stay member 4 substantially without a gap therebetween. The large diameter portion of the tubular portion 32 has a circular cross section that has an outside diameter that is larger than the inside diameter of the middle stay member 4. With such a structure, an end of the middle stay member 4 that is fitted onto the small diameter portion of the tubular portion 32 comes into contact with a step between the small diameter portion and the large diameter portion of the tubular portion 32. The tubular portion 32 has a central axis extending substantially in the vehicle-length direction. The step between the small diameter portion and the large diameter portion of the tubular portion 32 and an edge of the tubular portion 32 at the second end, at which the cover portion 33 is disposed, extend substantially parallel to the flange 31, which is fixed to the vehicle body so as to be in surface contact with the vehicle body. In the present embodiment, the tubular portion 32 has a stepped cylindrical shape. However, it is not necessary that the tubular portion 32 have such a shape. The tubular portion 32 may have a substantially uniform cross-sectional shape from the first end, at which the flange 31 is disposed, to the second end, at which the cover portion 33 is disposed. For example, the cross-sectional shape may be a circle that is substantially the same as that of the tubular portion 22 of the front stay member 2.

The cover portion 33, which is circular, is disposed inward from the outer peripheral edge at the second end. The cover portion 33 may be omitted. In this case, the second end of the tubular portion 32 is open. However, by providing the cover portion 33, the rigidity of the rear stay member 3 can be increased and the rear stay member 3 can be made thinner, so that reduction in the weight of the bumper stay can be realized.

As illustrated in FIGS. 2 and 3, the middle stay member 4 according to the present embodiment is a tubular member having such a shape that the second end of the tubular portion 22 of the front stay member 2, at which the cover portion 23 is disposed, and the second end of the tubular portion 32 of the rear stay member 3, at which the cover portion 23 is disposed, can be inserted into the middle stay member 4 substantially without a gap therebetween. The middle stay member 4 is disposed so that the central axis thereof extends substantially in the vehicle-length direction. An edge of the middle stay member 4 at a first end, which is fitted onto the tubular portion 22 of the front stay member 2, has a slope that matches the slope of the inclined portion of the rear wall 62 of the bumper reinforcement 6. An edge of the middle stay member 4 at a second end, which is fitted onto the tubular portion 32 of the rear stay member 3, is substantially parallel to the flange 31 of the rear stay member 3.

It is preferable that the middle stay member 4 be made of a material having a higher electrical conductibility than the materials of the front stay member 2 and the rear stay member 3. For example, the middle stay member 4 is made of an aluminum alloy. The middle stay member 4 according to the present embodiment is made by, for example, extruding an aluminum alloy so as to form a cylindrical shape. The middle stay member 4 has a circular cross section that has a diameter slightly larger than the outside diameter of the tubular portion 22 of the front stay member 2 and the outside diameter of the small diameter portion of the tubular portion 32 of the rear stay member 3.

The middle stay member 4 includes a plurality of recesses 41. When an axial load is applied to the middle stay member 4 in the vehicle-length direction, the recesses 41 collapse first and the middle stay member 4 collapses into an accordion-like shape. Therefore, collision energy applied to the vehicle can be efficiently absorbed. The plurality of recesses 41 are formed beforehand in the middle stay member 4 by electromagnetic expansion, electromagnetic compression, hydroforming, rolling, or the like.

As in the bumper reinforcement 6, one or more ribs may be formed in the hollow space in the middle stay member 4 in order to reinforce the middle stay member 4.

First, the second end of the tubular portion 22 of the front stay member 2, at which the cover portion 23 is disposed, is inserted from the front wall 61 of the bumper reinforcement 6 into the through-hole 61a and the through-hole 62a until the flange 21 comes into surface contact with the front surface of the front wall 61a around the entire periphery of the through hole 61a. Then, the first end of the middle stay member 4 is fitted onto the second end of the tubular portion 22 of the front stay member 2, which protrudes from the through-hole 62a in the rear wall 62, until an edge of the middle stay member 4 at the first end comes into contact with the rear wall 62. Subsequently, the second end of the middle stay member 4 is fitted onto the second end of the tubular portion 32 of the rear stay member 3 until an edge of the middle stay member 4 at the second end comes into contact with the step on the tubular portion 32 of the rear stay member 3 (or, in a case where the tubular portion 32 does not have a step, the flange 31 of the rear stay member 3).

It is preferable that a reinforcement plate 42 be disposed between the edge of the middle stay member 4 at the first end and the rear wall 62 of the bumper reinforcement 6 as illustrated in FIG. 2. The reinforcement plate 42 has a predetermined thickness and has an annular shape having a through hole that allows the reinforcement plate 42 to be fitted onto the tubular portion 22 of the front stay member 2. With the reinforcement plate 42, when an axial load is applied to the middle stay member 4, the middle stay member 4 does not penetrate into the bumper reinforcement 6 but collapses into an accordion-like shape. Therefore, collision energy applied to the vehicle can be efficiently absorbed.

Next, as illustrated in FIG. 4, an electromagnetic forming device 7 is disposed so as to surround the bumper stay 5 having the structure described above. The electromagnetic forming device 7 includes an inductor 71, which is connected to a power source, and a magnetic field shaper 72 disposed inside the inductor 71. The magnetic field shaper 72 concentrates a magnetic flux generated by the inductor 71. The magnetic field shaper 72, which can be divided into segments, is disposed so as to face an outer peripheral surface of a portion of the middle stay member 4 that overlaps the front stay member 2 and an outer peripheral surface of a portion of the middle stay member 4 that overlaps the rear stay member 3 (in the example illustrated in FIG. 4, so as to face an outer peripheral surface of a portion of the middle stay member 4 that overlaps the front stay member 2).

When a large pulse current is supplied from the power source to the inductor 71, a magnetic flux generated by the inductor 71 is concentrated on a surface of the magnetic field shaper 72 that faces the outer peripheral surface of the portion of the middle stay member 4 that overlaps the front stay member 2 and the outer peripheral surface of the portion of the middle stay member 4 that overlaps the rear stay member 3. Thus, a force that increases the distance between the magnetic field shaper 72 and the outer peripheral surface of the portion of the middle stay member 4 that overlap the front stay member 2 and a force that increases the distance between the magnetic field shaper 72 and the outer peripheral surface of the portion of the middle stay member 4 that overlap the rear stay member 3 are applied to these outer peripheral surfaces.

This force causes the portion of the middle stay member 4 that overlaps the front stay member 2 and the portion of the middle stay member 4 that overlaps the rear stay member 3 to be contracted.

When the middle stay member 4 is electromagnetically compressed, the front stay member 2 and the rear stay member 3 may be compressed to some extent. However, the middle stay member 4 is made of a material having a higher conductivity than those of the front stay member 2 and the rear stay member 3, and the front stay member 2 and the rear stay member 3 are made of a material having high rigidity. Therefore, when electromagnetic compression is performed, the amount of contraction of the middle stay member 4, which is disposed outside, is larger than the amount of contraction of each of the front stay member 2 and the rear stay member 3, which are disposed inside. As a result, the portion of the middle stay member 4 that overlaps the front stay member 2 and the portion of the middle stay member 4 that overlaps the rear stay member 3 are electromagnetically compressed so that the middle stay member 4 is clinched onto the front stay member 2 and the rear stay member 3.

In the example illustrated in FIG. 4, the magnetic field shaper 72 is disposed so as to face a portion of the middle stay member 4 that overlaps the front stay member 2. Therefore, it is necessary to independently clinch the portion of the middle stay member 4 that overlaps the front stay member 2 and the portion of the middle stay member 4 that overlaps the rear stay member 3 by electromagnetically compressing the middle stay member 4. However, by using the magnetic field shaper 72 that is configured so that the magnetic field shaper 72 simultaneously faces the outer peripheral surface of the portion of the middle stay member 4 that overlaps the front stay member 2 and the outer peripheral surface of the portion of the middle stay member 4 that overlaps the rear stay member 3, the electromagnetic forming device 7 can simultaneously clinch both overlapping portions.

Electromagnetic compression using an electromagnetic forming device is a method for forming an object placed inside an inductor by generating a strong magnetic field by supplying a large pulse current of, for example, more than 20 kA to the inductor and causing interaction between an eddy current that flows in the object and the magnetic field. This method is disclosed, for example, in Japanese Unexamined Patent Application Publication No. 2010-126832 and Japanese Unexamined Patent Application Publication No. 10-314869.

Figure 5:
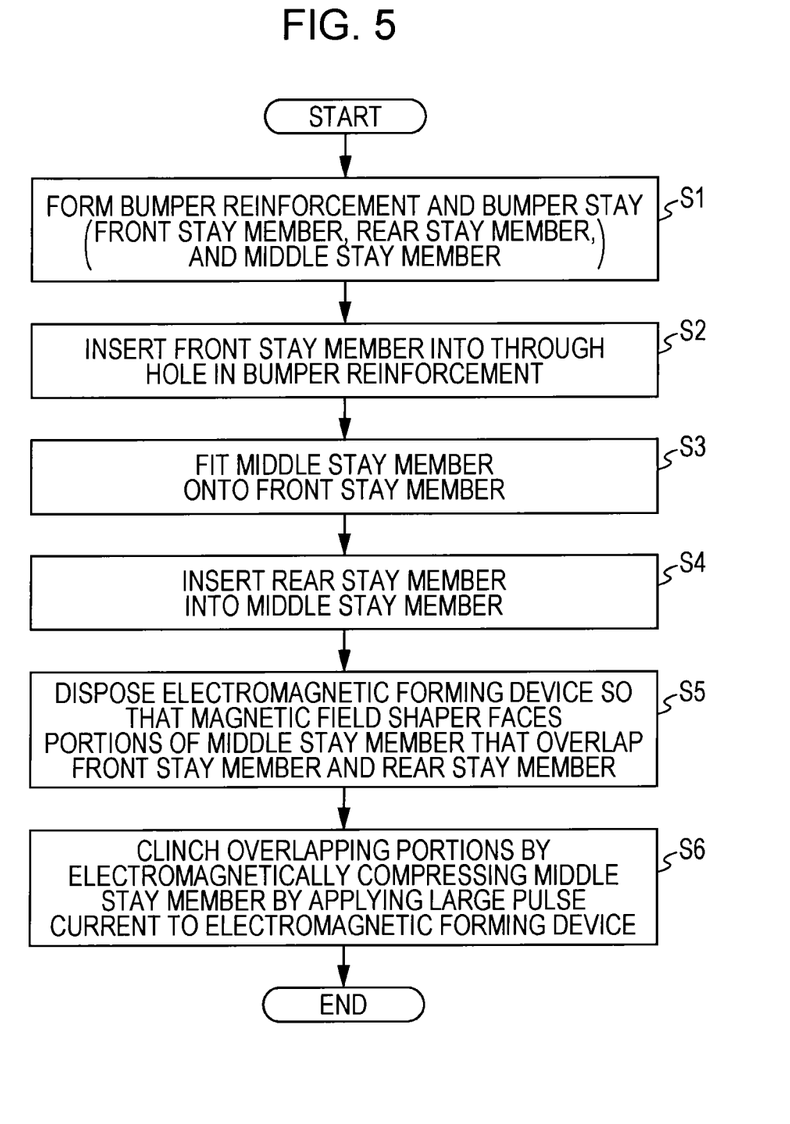
FIG. 5 is a flowchart illustrating the steps of a method of manufacturing the automobile bumper structure according to the embodiment.

Referring to FIG. 5, a method of manufacturing an automobile bumper structure according to the present embodiment will be described. FIG. 5 is a flowchart illustrating the steps of the method of manufacturing the automobile bumper structure according to the present embodiment.

First, the bumper reinforcement 6; and the front stay member 2, the rear stay member 3, and the middle stay member 4 of the bumper stay 5 are formed (S1).

Next, the second end of the tubular portion 22 of the front stay member 2, at which the cover portion 23 is disposed, is inserted from the front wall 61 of the bumper reinforcement 6 into the through-hole 61a and then into the through-hole 62a until the flange 21 comes into surface contact with the front surface of the front wall 61 around the entire periphery of the through-hole 61a (S2).

Then, the middle stay member 4 is fitted onto the second end of the tubular portion 22 of the front stay member 2, which protrudes from the through-hole 62a in the rear wall 62 of the bumper reinforcement 6, until the edge of the middle stay member 4 at the first end comes into contact with the rear wall 62 (S3).

The middle stay member 4 is fitted onto the second end of the tubular portion 32 of the rear stay member 3 until the edge of the middle stay member 4 at the second end comes into contact with the step on the tubular portion 32 of the rear stay member 3 (or, in a case where the tubular portion 32 does not have a step, the flange 31 of the rear stay member 3) (S4).

The electromagnetic forming device 7 is disposed so that the magnetic field shaper 72 faces the outer peripheral surface of the portion of the middle stay member 4 that overlaps the front stay member 2 and the outer peripheral surface of the portion of the middle stay member 4 that overlaps the rear stay member 3 (S5).

A large pulse current is supplied from the power source to the inductor 71 of the electromagnetic forming device 7 so that a magnetic flux generated by the inductor 71 is concentrated on a surface of the magnetic field shaper 72 that faces the outer peripheral surface of the portion of the middle stay member 4 that overlaps the front stay member 2 and the outer peripheral surface of the portion of the middle stay member 4 that overlaps the rear stay member 3. By doing so, the portion of the middle stay member 4 that overlaps the front stay member 2 and the portion of the middle stay member 4 that overlaps the rear stay member 3 are electromagnetically compressed so that the middle stay member 4 is clinched onto the front stay member 2 and the rear stay member 3 (S6).

As described above, with the automobile bumper structure 1 according to the present embodiment and the method of manufacturing the automobile bumper structure 1, the bumper stay 5 is divided into three members, that is, the front stay member 2, the middle stay member 4, and the rear stay member 3; and the flanges 21 and 31 are formed beforehand on the front stay member 2 and the rear stay member 3. The front stay member 2 is inserted into the through-holes 61a and 62a in the bumper reinforcement 6 until the flange 21 of the front stay member 2 comes into surface contact with the front wall 61 of the bumper reinforcement 6. The first end of the middle stay member 4 is fitted onto the tubular portion 22 of the front stay member 2, which protrudes from the rear wall 62 of the bumper reinforcement 6, until the first end comes into contact with the rear wall 62 of the bumper reinforcement 6. The second end of the tubular portion 32 of the rear stay member 3 is inserted into the second end of the middle stay member 4. The flange 31, which is fixed to the vehicle, is disposed at the first end of the rear stay member 3. The magnetic field shaper 72 is disposed so as to face and cover the outer peripheral surface of the middle stay member 4 that overlaps the front stay member 2 and the outer peripheral surface of the middle stay member 4 that overlaps the rear stay member 3. By applying an electromagnetic force to the magnetic field shaper 72 using the inductor 71 disposed outside the magnetic field shaper 72, the middle stay member 4 is electromagnetically compressed and the middle stay member 4 is clinched onto the front stay member 2 and the rear stay member 3. Thus, the three members of the bumper stay 5 are clinched to each other by electromagnetic compression, and the bumper stay 5 can be firmly fixed to the bumper reinforcement 6. Because the magnetic field shaper 72 and the inductor 71 are disposed outside of the bumper stay 5, a space for disposing the magnetic field shaper 72 and the inductor 71 is not limited, and the size of the bumper stay 5 can be reduced. By performing electromagnetic compression by applying high power to the magnetic field shaper 72, clinching can be performed with a strong force, so that a high-strength material can be used as the material of the bumper stay 5. Accordingly, the strength of the bumper structure 1 can be increased and the size of the bumper structure 1 can be reduced. By forming the flanges 21 and 31 beforehand on the front stay member 2 and the rear stay member 3, it is not necessary to form the flanges 21 and 31 afterwards by electromagnetic expansion. Accordingly, the number of man-hours needed to manufacture the bumper structure 1 is reduced and the workload is reduced.

The present invention is not limited to the embodiment described above, and can be modified in various ways within the scope of the present invention described in the claims.

In the present embodiment, the cross-sectional shape of the tubular portion 22 of the front stay member 2, the cross-sectional shape of the tubular portion of the rear stay member 3, the cross-sectional shape of the middle stay member 4, and the shapes of the through-holes 61a and 62a formed in the bumper reinforcement 6 are circular. However, these cross-sectional shapes need not be circular and may be rectangular or polygonal. In this case, the strengths of tubular members in the axial direction are increased and the impact resistance of the vehicle body in the vehicle-length direction can be increased.

An insulating resin layer may formed beforehand on either one of an outer peripheral surface of a portion of the front stay member 2 that overlaps the middle stay member and an inner peripheral surface of the portion of the middle stay member 4 that overlaps the front stay member 2. Likewise, an insulating resin layer may be formed beforehand on either one of an outer peripheral surface a portion of the rear stay member 3 that overlaps the middle stay member 4 and an inner peripheral surface of the portion of the middle stay member 4 that overlaps the rear stay member 3. In this case, the middle stay member 4 has a cylindrical shape that has a circular cross section having an inside diameter that is slightly larger than the outside diameter of the tubular portion 22 of the front stay member 2, on which the resin layer is formed, and the outside diameter of and the tubular portion 32 of the small diameter portion of the rear stay member 3, on which the resin layer is formed. The middle stay member 4 is fitted onto the second end of the tubular portion 22 of the front stay member 2 in a state in which a resin layer is formed on at least one of the inner surface of the middle stay member 4 and the outer surface of the front stay member 2. Moreover, the middle stay member 4 is fitted onto the second end of the tubular portion 32 of the rear stay member 3 in a state in which a resin layer is formed on at least one of the inner surface of the middle stay member 4 and the outer surface of the rear stay member 3. Then, a portion of the middle stay member 4 that overlaps the front stay member 2 and a portion of the middle stay member 4 that overlaps the rear stay member 3 are electromagnetically compressed. When the middle stay member 4 is electromagnetically compressed, the front stay member 2 and the rear stay member 3 may be compressed to some extent. In this case, however, because insulating resin layers are disposed between the middle stay member 4 and the front stay member 2 and between the middle stay member 4 and the rear stay member 3, the middle stay member 4 is insulated from the front stay member 2 and the rear stay member 3. Accordingly, when the middle stay member 4 is electromagnetically compressed, the amount of contraction of each of the front stay member 2 and the rear stay member 3 is smaller than the amount of contraction of the middle stay member 4, and these members can be more strongly clinched to each other. An adhesive tape, which has an adhesive layer on a substrate, may be used as the resin layer. In this case, due to an adhesive force of the adhesive tape, the middle stay member 4 can be more strongly joined to the front stay member 2 and the rear stay member 3.

The front stay member 2 and the rear stay member 3 may be made from a steel material coated with an insulating layer. When the middle stay member 4 is electromagnetically compressed, the front stay member 2 and the rear stay member 3 may be compressed to some extent. In this case, however, because the middle stay member 4 and the front stay member 2 are made from a steel material coated with an insulating layer, the middle stay member 4 is insulated from the front stay member 2 and the rear stay member 3. Accordingly, when the middle stay member 4 is electromagnetically compressed, the amount of contraction of each the front stay member 2 and the rear stay member 3 is made further smaller than the amount of contraction of the middle stay member 4, and these members can be more strongly clinched to each other.

What is claimed is:

1. An automobile bumper structure comprising:
   a bumper reinforcement extending in a vehicle-width direction and including a through-hole extending therethrough in a vehicle-length direction from a front wall to a rear wall thereof; and
   a bumper stay including
      a front stay member including a tubular portion and a flange extending outward from an outer peripheral edge at a first end of the tubular portion, the front stay member being inserted into the through-hole so that the flange is in surface contact with the front wall of the bumper reinforcement and so that a second end of the tubular portion protrudes from the rear wall of the bumper reinforcement,
      a rear stay member including a tubular portion and a flange extending outward from an outer peripheral edge at a first end of the tubular portion, and
      a middle stay member having a tubular shape, a first end of the middle stay member being fitted onto the second end of the tubular portion of the front stay member protruding from the rear wall of the bumper reinforcement, a second end of the middle stay member being fitted onto a second end of the tubular portion of the rear stay member,
   wherein a portion of the middle stay member that overlaps the front stay member and a portion of the middle stay member that overlaps the rear stay member are electromagnetically compressed so that the middle stay member is clinched onto the front stay member and the rear stay member,
   wherein an insulating resin layer is formed beforehand on either one of an outer peripheral surface of a portion of the front stay member that overlaps the middle stay member and an inner peripheral surface of the portion of the middle stay member that overlaps the front stay member, and an insulating resin layer is formed beforehand on either one of an outer peripheral surface a portion of the rear stay member that overlaps the middle stay member and an inner peripheral surface of the portion of the middle stay member that overlaps the rear stay member.

2. The automobile bumper structure according to claim 1, wherein the front stay member and the rear stay member are each made of a material that has a lower electrical conductivity and a higher rigidity than a material of the middle stay member.

3. The automobile bumper structure according to claim 2, wherein the middle stay member is made of an aluminum alloy and the front stay member and the rear stay member are each made of a high-strength aluminum alloy or steel.

4. The automobile bumper structure according to claim 3, wherein the front stay member and the rear stay member are each made of a steel material coated with an insulating layer.

5. An automobile bumper structure comprising:
a bumper reinforcement extending in a vehicle-width direction and including a through-hole extending therethrough in a vehicle-length direction from a front wall to a rear wall thereof; and
a bumper stay including
   a front stay member including a tubular portion and a flange extending outward from an outer peripheral edge at a first end of the tubular portion, the front stay member being inserted into the through-hole so that the flange is in surface contact with the front wall of the bumper reinforcement and so that a second end of the tubular portion protrudes from the rear wall of the bumper reinforcement,
   a rear stay member including a tubular portion and a flange extending outward from an outer peripheral edge at a first end of the tubular portion, and
   a middle stay member having a tubular shape, a first end of the middle stay member being fitted onto the second end of the tubular portion of the front stay member protruding from the rear wall of the bumper reinforcement, a second end of the middle stay member being fitted onto a second end of the tubular portion of the rear stay member,
   wherein a portion of the middle stay member that overlaps the front stay member and a portion of the middle stay member that overlaps the rear stay member are electromagnetically compressed so that the middle stay member is clinched onto the front stay member and the rear stay member,
   wherein the front stay member and the rear stay member are each made of a material that has a lower electrical conductivity and a higher rigidity than a material of the middle stay member,
   wherein the middle stay member is made of an aluminum alloy and the front stay member and the rear stay member are each made of a high-strength aluminum alloy or steel,
   wherein the front stay member and the rear stay member are each made of a steel material coated with an insulating layer.

6. The automobile bumper structure according to claim 5, further comprising:
a reinforcement plate that is disposed between the middle stay member and the bumper reinforcement so as to be in contact with an end of the middle stay member and so as to surround an outer periphery of the tubular member of the front stay member in a state in which the middle stay member is fitted onto the front stay member.

7. The automobile bumper structure according to claim 5, wherein the middle stay member includes a plurality of recesses.

* * * * *